(12) United States Patent
Repka

(10) Patent No.: US 11,509,624 B2
(45) Date of Patent: Nov. 22, 2022

(54) VENDOR KIOSK TRACKING AND ROUTING SYSTEM OVER LOCAL AREA NETWORK AND METHOD OF USE

(71) Applicant: KODAK ALARIS INC., Rochester, NY (US)

(72) Inventor: Mark R. Repka, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 0 days.

(21) Appl. No.: 16/288,835

(22) Filed: Feb. 28, 2019

(65) Prior Publication Data

US 2019/0273714 A1  Sep. 5, 2019

Related U.S. Application Data

(60) Provisional application No. 62/637,176, filed on Mar. 1, 2018.

(51) Int. Cl.
*H04L 61/4511* (2022.01)
*H04L 61/10* (2022.01)
(Continued)

(52) U.S. Cl.
CPC .......... *H04L 61/4511* (2022.05); *G06Q 20/18* (2013.01); *G06Q 30/06* (2013.01);
(Continued)

(58) Field of Classification Search
CPC . H04L 61/1511; H04L 61/10; H04L 61/2038; G06Q 20/18; G06Q 30/06; G06Q 30/0601
See application file for complete search history.

(56) References Cited

U.S. PATENT DOCUMENTS

| 6,286,029 | B1* | 9/2001 | Delph | ..................... G06F 16/95 |
| | | | | 709/204 |
| 2001/0007086 | A1* | 7/2001 | Rogers | ..................... H04L 67/34 |
| | | | | 701/34.3 |

(Continued)

FOREIGN PATENT DOCUMENTS

EP         1 029 292 B1       2/2006

OTHER PUBLICATIONS

Anonymous: "Wildcard DNS record—Wikipedia," Jan. 7, 2018 (Jan. 7, 2018), pp. 1-3, XP055589729, Retrieved from the Internet: URL:https://en.wikipedia.org/w/index.php?title=Wildcard DNS record &oldid=819125493 [retrieved on May 17, 2019] the whole document.

(Continued)

*Primary Examiner* — Viet D Vu
(74) *Attorney, Agent, or Firm* — Hogan Lovells US LLP

(57) ABSTRACT

A local area network tracking system and method of use is described herein. An exemplary embodiment of the system comprises a central tracker server that registers and tracks third-party vendor kiosks when the kiosks connect to a retail store local area network. The unique tracker server system is configured to efficiently route web application traffic on the same retail store local area network. The tracker server stores a local IP address and a unique identifier for each vendor kiosk connected to a particular retail store network. Customers connected to the network are routed to the tracker server to obtain the IP address for a suitable vendor kiosk, with which the customer can establish a direct wireless connection to that kiosk over the retail store network. The system described herein can be implemented without modifying any aspect of the retail store LAN infrastructure.

11 Claims, 3 Drawing Sheets

(51) Int. Cl.
*H04W 8/00* (2009.01)
*G06Q 20/18* (2012.01)
*G06Q 30/06* (2012.01)
*H04L 61/5038* (2022.01)

(52) U.S. Cl.
CPC .......... *H04L 61/10* (2013.01); *H04L 61/5038* (2022.05); *H04W 8/005* (2013.01); *G06Q 30/0601* (2013.01)

(56) References Cited

U.S. PATENT DOCUMENTS

| | | | | |
|---|---|---|---|---|
| 2002/0091870 | A1* | 7/2002 | Madl | G06F 9/545 719/313 |
| 2006/0287936 | A1* | 12/2006 | Jacobson | G06Q 30/02 705/35 |
| 2008/0201487 | A1* | 8/2008 | Blinn | H04L 61/3015 709/245 |
| 2010/0036969 | A1 | 2/2010 | Perry | |
| 2014/0006577 | A1* | 1/2014 | Joe | H04L 61/4511 709/223 |
| 2017/0103489 | A1* | 4/2017 | Asad | H04L 67/18 |
| 2018/0077036 | A1* | 3/2018 | Zhao | H04W 4/70 |
| 2018/0309712 | A1* | 10/2018 | Jeong | H04L 61/1511 |

OTHER PUBLICATIONS

Anonymous: "Dynamic DNS—Wikipedia," Jan. 2, 2018 (Jan. 2, 2018), pp. 1-4, XP055589731, Retrieved from the Internet: URL:https://en.wikipedia.org/w/index.php?t itle= Dynamic DNS&oldid= 818198786 [retrieved on May 17, 2019] the whole document.

Anonymous: "Dynamic Host Configuration Protocol—Wikipedia," Feb. 27, 2018 (Feb. 27, 2018), pp. 1-23, XP055589733, Retrieved from the Internet: URL:https://en.wikipedia.org/w/index.php?t itle= Dynamic Host Configuration Protocol&o Idid=827986500—[retrieved on May 17, 2019] p. 1-p. 3, last paragraph.

Anonymous: "Zero-configuration networking—Wikipedia," Jan. 30, 2018 (Jan. 30, 2018), pp. 1-11, XP055589735, Retrieved from the Internet: URL:https://en.wikipedia.org/w/index.php?t itle= Zero-configuration networking&oldid=823148787—[retrieved on May 17, 2019] p. 1-p. 9, paragraph 1.

International Search Report and Written Opinion dated May 28, 2019 issued in International Application No. PCT/US2019/020021.

* cited by examiner

VENDOR KIOSK TRACKING AND ROUTING SYSTEM OVER LOCAL AREA NETWORK AND METHOD OF USE

CROSS REFERENCE TO RELATED APPLICATIONS

This is application is a non-provisional of, and claims priority to, U.S. Provisional Application No. 62/637,176, filed on Mar. 1, 2018. That provisional application is hereby incorporated by reference in its entirety.

BACKGROUND

In commercial environments, clients (otherwise referred to herein as users or consumers) frequently seek to wirelessly connect to local area networks ("LANs"), including via Wi-Fi. Such environments can include retail stores, restaurants, airports, and the like. Third-party vendors often implement devices, products, kiosks, etc. to interact with consumers, to solicit such products to consumers, or to utilize such products to facilitate consumer interaction and sales of other products. By way of example only, certain retail stores include third-party photo kiosks, which consumers can use and interact with to place and retrieve photo product orders. (For ease of reference, the third-party photo kiosk example will be referenced predominately herein, but such reference should be understood as non-limiting.) Many third-party vendor products are capable of broadcasting their own wireless LAN or Wi-Fi signal to which consumers may connect. It is common for consumers to use wireless applications on their personal devices, such as their smartphones, to interact with these third-party vendor products or kiosks. In particular circumstances, the interaction occurs based on a direct connection of the consumer's device to the kiosk's Wi-Fi.

Directly connecting with a third-party kiosk's Wi-Fi signal in a retail store has drawbacks, however. For example, third-party vendor products and kiosks that broadcast their own Wi-Fi signal have limited range. Consumers therefore must remain in close proximity to the particular kiosk to remain connected. In many commercial environments, this is disadvantageous because it does not allow the consumer to move freely within the store or restaurant without risking disconnection. In addition to third-party kiosks having the capability of broadcasting their own Wi-Fi signal, most of the commercial environments in which third-party vendor products are located also broadcast their own Wi-Fi signal. And, often, this Wi-Fi signal is much stronger and has a larger range, typically providing coverage for the entire store. Consumers, therefore, are generally more inclined to connect to store Wi-Fi, as opposed to the third-party vendor product's Wi-Fi.

This situation presents yet another issue: if a consumer connects to the store Wi-Fi, then she must disconnect from the third-party vendor kiosk Wi-Fi. (This situation assumes that the consumer is unable to, or chooses not to, use some other wireless internet connection, like a cellular connection.) When connected to just the store Wi-Fi, the consumer is not able to connect with the third-party vendor kiosk. Retailers are reluctant to allow third-party vendors to tap into their Wi-Fi networks, or otherwise tie the third-party vendor kiosks into the broader store network. Doing so presents security risks and requires modifications to the network and hardware infrastructure.

One unique aspect of retail photo kiosks, in particular, is that users are required to provide digital image files to the kiosk for printing, or fulfillment of other photo product requests. With smartphones now as the primary means for consumer photography, users can wirelessly transfer images to interact with the photo kiosk. Current approaches route all such traffic destined for the kiosk over slower, less efficient internet or external networks. Accordingly, a need exists for a way to enable third-party vendor products to integrate into, or "piggyback" on, retailers' LANs without requiring retailers to modify the network or hardware infrastructure. A further need exists for a way to register and track the third-party products connected to retailers' LANs. Finally, a need exists for a way to enable consumers to connect to a retailer's LAN and utilize that connection to connect with a third-party-vendor kiosk located within the retailer store.

SUMMARY OF THE INVENTION

An embodiment of the present invention provides a system comprising a kiosk, a tracker server, and a root domain name system ("DNS") server. Using the centrally located tracker server, the system enables kiosks to check in and report their local IP address and a kiosk-specific ID (a "GUID"). The kiosks are located in any commercial environment, such as a retail store or restaurant, and are configured to connect to the retail store Wi-Fi. The tracker server is configured to efficiently route client web application traffic to registered kiosks within a particular retail store. Upon receiving an IP address and GUID from a particular kiosk, the tracker server is configured to create a device specific subdomain ("DSS") for the kiosk. The tracker server is further configured to send an update to the root DNS server, which in turn maps the DSS to the local IP address of the kiosk.

In another embodiment, the system further comprises a smartphone application or web browser configured to run on a smartphone or any other similar client device (e.g., tablet, laptop). Connection to the web application is triggered by connecting the smartphone to the internet via connecting to a LAN or Wi-Fi (in a retail store, for example). The web application is configured to request geographic information from a user, such as a street address, zip code, or city, or to request geographic information from the user's device via GPS. Upon receipt of the geographic information, the web application is configured to locate all commercial locations within some pre-established proximity threshold, in which kiosks are located. The web application is further configured to receive user selection of a retail store from the list of retails stores provided. Upon receipt of the retail store selection, the tracker server is configured to transmit to the user's smartphone a DNS-friendly name—based on the previously created DSS—that resolves into the local IP address for a kiosk located within the selected retail store.

According to another embodiment of the present invention, a method of tracking a local IP address and GUID for each kiosk connected to a wireless LAN or Wi-Fi network. The method comprises receiving a local IP address associated with a kiosk, wherein the kiosk is connected to a Wi-Fi network. The method further comprises creating a DNS-friendly DSS for the kiosk, and then sending an update request to a root DNS server, wherein the update request comprises the DSS. The method further comprises mapping the DSS to the IP address of the kiosk.

According to another embodiment of the present invention, a method of connecting a consumer to a kiosk is provided. The method comprises receiving, at a top-level web application, web application, or smartphone application, geographic information, wherein the geographic information identifies a location of a user. The method further comprises the web application generating a list of proximate retail stores based on the geographic information, wherein each retail store on the list includes a kiosk. The method further comprises receiving a selection of a preferred retail store from the list of proximate retail stores. The method further comprises providing to the user device, via the web application, a DSS name associated with a kiosk located in the preferred retail store, wherein the DSS name is compatible with parameters and restraints of a root DNS server, and wherein the DSS name resolves to a local IP address of the kiosk. Lastly, the method further comprises receiving an HTTPS HEAD or HTTPS GET request at the local webserver on the kiosk.

According to another aspect of the invention, once a kiosk powers on, it reports its local IP address to the tracker server. The tracker server creates a DNS-friendly subdomain name based on the kiosk's reported IP address. The tracker server then sends a request to update the root DNS server for the configured domain.

Embodiments of the present invention are advantageous for consumers. For example, assume a consumer desires to use a photo product creation web application. According to certain embodiments of the present invention, the consumer connects to an internal network. The consumer may use an internet-based browser or application (on a desktop, laptop, tablet, smartphone etc.) to navigate to configured top-level web application domains. Upon arrival at such domain, the consumer provides location information by, for example, entering the consumer's zip code or enabling GPS location tracking and sharing GPS location information. The tracker server provides the customer a listing of convenient store locations proximate to the customer's location, based on the customer's location provided location information. The customer selects a desired store location. With that selection, the tracker server provides to the customer's device a DNS-friendly name that resolves the local IP address of a kiosk in the customer's selected store location. The customer's browser or application generates an HTTPS HEAD request and transmits it to the local webserver on the kiosk identified by the tracker server. That webserver then replies with a confirmation that the corresponding kiosk is at the appropriate store location and is the kiosk for which the customer's browser or application had been seeking. Finally, with this confirmation, the customer's browser redirects to the DNS-friendly subdomain name in order to communicate with the designated kiosk. The customer can submit product requests via this communication link with the kiosk.

Exemplary embodiments will be discussed in more detail below, but the present invention offers several advantages. For example the system of the present invention is configured to determine the IP address for a third-party vendor kiosk at a preferred retail store location using only the retail store LAN connection. With that IP address, the system enables a customer to establish a direct connection to a third-party vendor kiosk over the retail store LAN, which provides better network performance as compared to connecting to the third-party vendor kiosk via an external proxy or relay server over the internet.

BRIEF DESCRIPTION OF THE DRAWINGS

The features of the invention will become more readily apparent and may be better understood by referring to the following detailed description and accompanying drawings, in which.

DETAILED DESCRIPTION

Referring now in specific detail to the drawings, the present disclosure describes various embodiments of a central tracker server system and methods for using the same.

Figure 1:
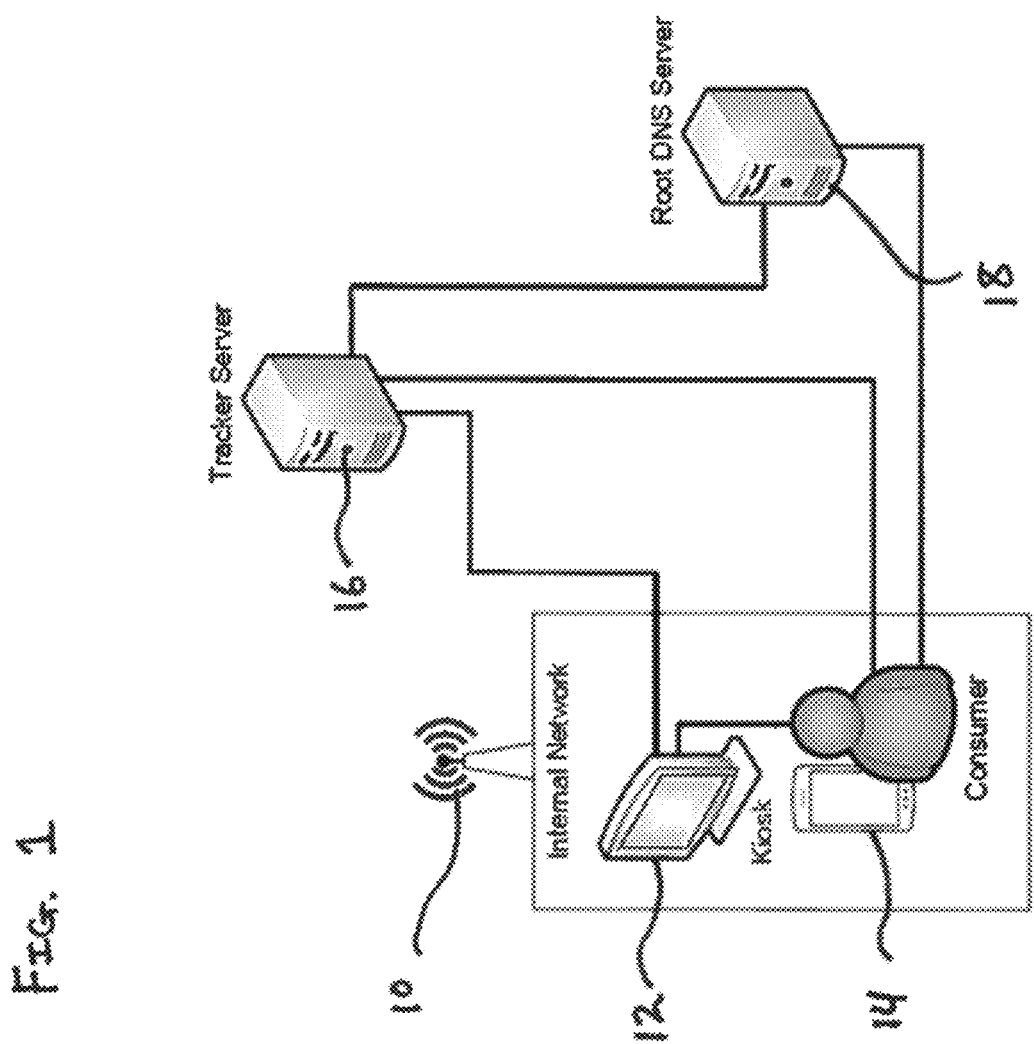
FIG. 1 illustrates an embodiment of the tracker server system.

FIG. 1 illustrates an exemplary embodiment of the system of the present invention. The system comprises a kiosk 12, smartphone 14, tracker server 16, and root DNS server 18. Kiosk 12 can be any computer hardware device, such as desktop computer or tablet computer, which is configured to connect wirelessly to a LAN 10, such as a Wi-Fi network. Smartphone 14 may be any remote client device that is configured to connect wirelessly to any LAN 10, such as the same Wi-Fi network to which the kiosk 12 connects. Smartphone 14 may therefore also be a tablet or laptop computer.

According to a particular embodiment, one or more kiosks 12 are located within a commercial environment. For the sake of reference, this disclosure will refer predominately to a retail store, but it should be understood that kiosks 12 may be placed in any commercial environment, including restaurants, airports, arenas, stadiums, and the like—namely, any environment that provides a dedicated LAN. For the sake of reference, this disclosure will refer predominately to kiosk 12 as a retail photo kiosk configured to receive customer orders for photo products and fulfill those orders; however, it should be understood that kiosk 12 may be any type of third-party vendor product with which users wish to interact in a commercial environment setting. In a retail store embodiment, one or more photo kiosks 12 located in the retail store connect to Wi-Fi 10. Wi-Fi 10 is controlled and operated by the retail store, including the hardware and network infrastructure, whereas the kiosks 12 are not controlled by the retail store—they are owned and operated by a third-party vendor. Customers who visit the retail store may use their smartphones 14 to connect to the retail store Wi-Fi 10.

According to an embodiment, the system shown in FIG. 1 further comprises a centrally located tracker server 16. Generally, a tracker server is a centralized application server that creates and relays DSS information to client devices and to other servers, such as a root DNS server. Tracker server 16 is configured to connect to each kiosk 12 located in the retail store. To the extent multiple kiosks 12 are located in multiple retail stores, the tracker server 16 is configured to connect to each kiosk, so as to track, or register, all kiosks established in each of the various retail stores. The tracker server 16 is further configured to connect with customer smartphones 14, as well as to root DNS server 18. The tracker server 16 is further configured to register a local IP address and GUID for each kiosk 12 and use that information to efficiently route customer web application traffic to particular kiosks 12, as described in more detail below. The root DNS server 18 is a server computer dedicated to registering names and IP addresses of other hardware connected to a particular network. Root DNS server 18 is configured to store, or register, a database that maps domain names to IP addresses, such that when it receives a request for a particular domain name (e.g., uniqueid.kioskfinder-.net), it can resolve that name into an IP address.

Figure 2:
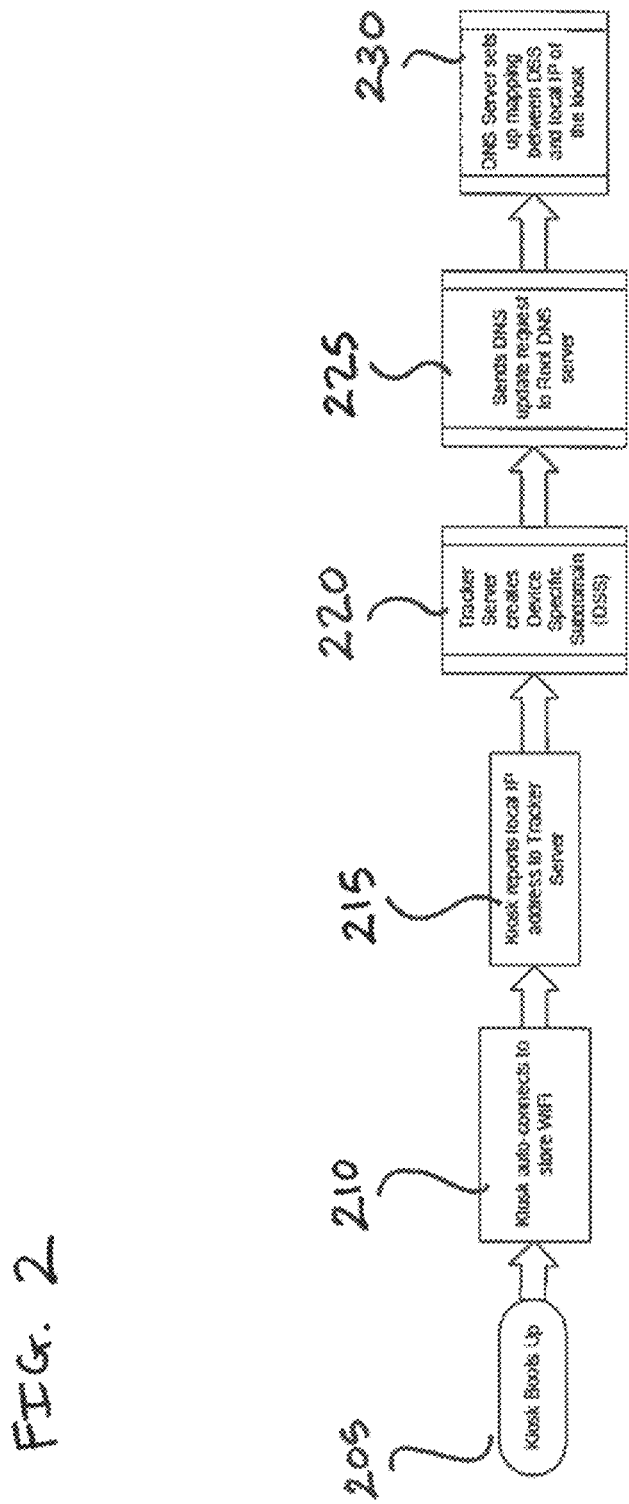
FIG. 2 is a flowchart illustrating the process steps of a particular embodiment of the present invention, performed by the system of FIG. 1.

Referring now to FIG. 2, which illustrates a method performed by the system described above and shown in FIG. 1. According to an embodiment, in the first process step 205, the kiosk 12 boots up. Boot up schedules may be automatic or manual. For example, a kiosk 12 may be set to re-boot at a pre-established time interval, such as daily, every 12 hours, or even hourly. Such a schedule may be pre-programmed into the kiosk's firmware. Alternatively, boot up and reboot schedules may be left to the workers at each particular retail store. For instance, rebooting a kiosk will occur only upon manual initiation by an employee of the retail store in which the kiosk is located.

Upon boot-up, at step 210, the kiosk 12 automatically connects to retail store Wi-Fi 10. Next, at step 215, the kiosk 12 transmits its local IP address to tracker server 16. The tracker server 16 then creates a device specific subdomain ("DSS"), which is unique to the kiosk (step 220). Generally, a DSS is a unique per-device domain that a kiosk obtains from, or is assigned by, the tracker server. It can be generated by its media access control ("MAC") address, a unique identifier assigned to a network interface controller for communications at the data link layer of a network segment. MAC addresses are known in the art and may be used as a network address for most IEEE 802 network technologies, including Ethernet, Wi-Fi and Bluetooth. Also at step 220, the tracker server 16 stores the local IP address for the specific kiosk 12 along with a unique identifier. The unique identifier (previously referred to as GUID), later functions as the DSS for that kiosk. Next, at step 225, the tracker server 16 sends an update request to root DNS server 18. The update request is a request for the root DNS server 18 to update its database with a new mapping of DSS-to-IP address for the kiosk 12. The root DNS server 18 update then occurs at step 230. The update configures the root DNS server 18 so that it is capable of returning the kiosk's IP address if a user later asks for the kiosk's subdomain (e.g., uniqueid.kioskfinder.net). These steps described in reference to FIG. 2 may be classified as prerequisite steps to a customer's full utilization of the system of FIG. 1.

Figure 3:
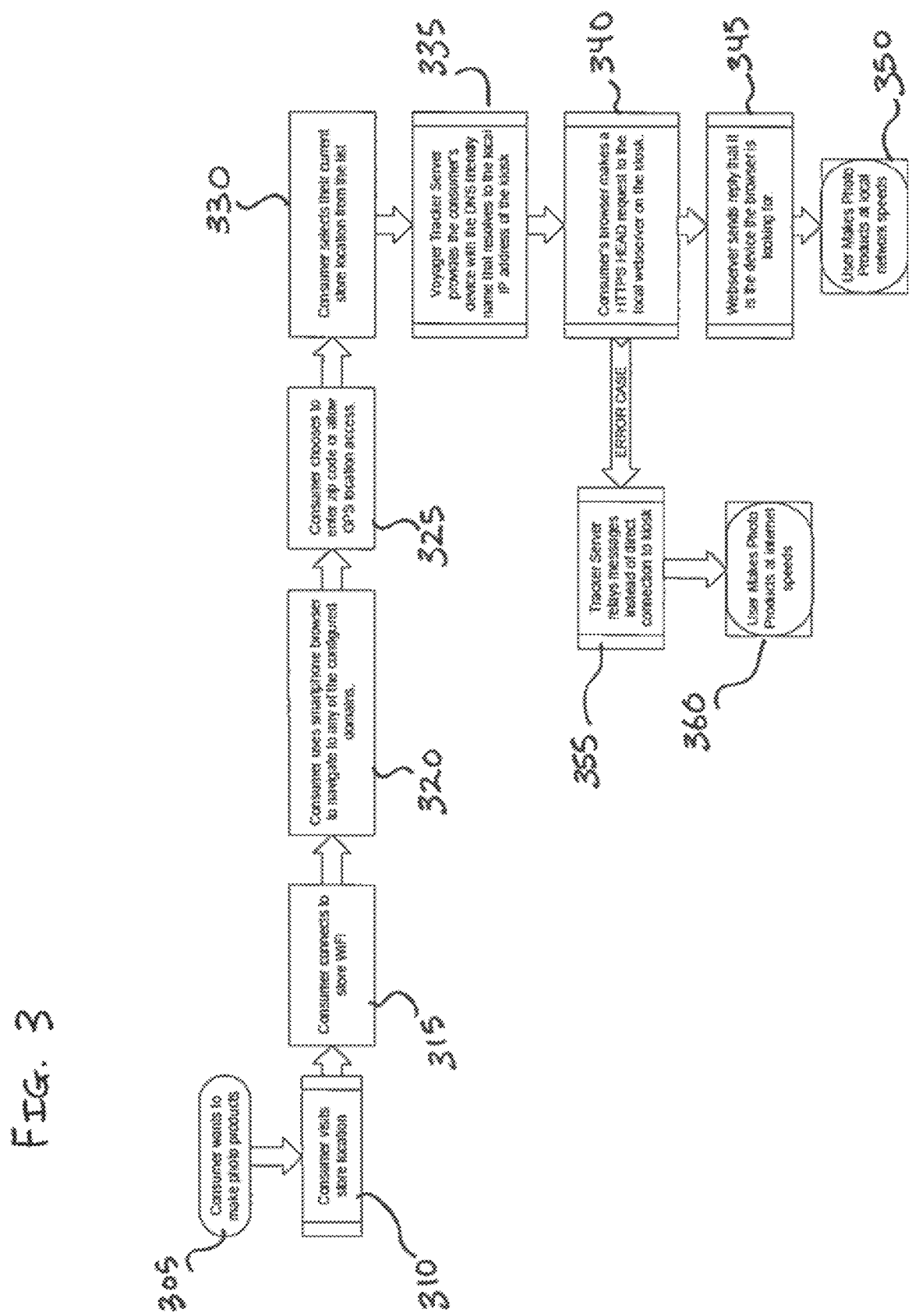
FIG. 3 is a flowchart illustrating the process steps of a particular embodiment of the present invention, performed by the system of FIG. 1.

The completion of all prerequisite method steps prepares the system for customer use. Referring now to FIG. 3, another exemplary embodiment of system functionality will be described. The initial step 305 begins with a customer seeking to order a photo product. As mentioned above, this process is described in the context of fulfilling photo product orders, but should not be limited to that context. This functionality applies equally in any commercial setting in which a customer interacts wirelessly via Wi-Fi or some other LAN with a third-party vendor product or kiosk in order to place or fulfill a commercial order. At step 310, the customer visits a retail store location, in which one or more kiosks 12 are located. Next, at step 315, the customer, via smartphone 14, connects to the retail store Wi-Fi 10. Once connected, the customer navigates via web application to a domain of a third-party vendor. Generally, the same third party will own and operate the kiosks 12 and the web domain, but in certain situations there may two distinct parties. It should be understood that a customer may navigate to a web application, smartphone application, or the like, as an alternative to accessing a third-party's domain via a web application.

Once connected to the third-party vendor web domain, the customer provides geographic or location information (step 325). This may be provided as an address, city, or zip code. Alternatively, it may be retrieved automatically from the smartphone's GPS location information, to the extent the customer has allowed such GPS location information to be shared wirelessly with the web domain. Using the smartphone's geographic location information, the web domain generates a list of retail store locations and displays the list via the web domain on the smartphone 14. This list includes all retail stores with operable kiosks that are within a pre-established proximity threshold from the geographic location information. Typically, list will include the retail stores that are physically closest to the user based on the geographic location information. At step 330, the customer selects her preferred retail store location.

Upon that selection, the tracker server 16 transmits to the customer's smartphone 14 a DNS-friendly name that resolves to the local IP address of a kiosk 12 located in the preferred retail store location (step 335). In other words, once the customer selects her preferred retail store location, the tracker server 16 replies by sending DSS information for a specific kiosk 12 to the customer's smartphone 14. The smartphone 14 then pings the root DNS server 18 with the DSS information for the kiosk 12; the root DNS server 18 maps the DSS information to the corresponding IP address for the kiosk 12.

At step 340, the smartphone 14, via its web browser and with the kiosk's IP address, makes an HTTPS HEAD or HTTPS GET request to the local webserver on the kiosk 12. For the user to connect directly to the kiosk 12, a valid HTTPS/SSL connection is required. With a valid connection, at step 345, the webserver on the kiosk 12 replies to the HTTPS HEAD request, confirming that it is the correct kiosk. This enables the customer to establish a direct connection with the kiosk 12 over the retail store Wi-Fi 10. With this connection, the customer can interact with the full functionality of the webserver on kiosk 12 (step 350). For example, the customer can upload digital images and place photo product orders from his smartphone, which are then processed by the kiosk 12. If the customer's HTTPS HEAD request is denied, or the HTTPS/SSL connection is invalid, or if there is some other connection error, then the tracker server 16 serves as a relay between the customer and the kiosk 12 (step 355). In this situation (step 360), the customer can still upload digital images and place photo product orders from his smartphone 12, but only if the smartphone is connected to the internet by some other means (e.g., via a cellular network). The drawback is that digital image uploads and photo product processing are restrained by the internet connection speeds of the alternative network, and the customer is not able to take advantage of faster speeds of LAN 10.

Referring back to the HTTPS HEAD request (step 340), the root domain for every particular kiosk 12 is known by the customer. Because the root domain is known in advance, each photo kiosk 12 may have a wildcard HTTPS certificate installed that will be valid for any subdomain on that root domain. For instance, if the root domain for a kiosk is kioskfinder.net, then the wildcard certificate that is installed on the kiosk will be *.kioskfinder.net. This means that any subdomain (e.g., validkiosk1.kioskfinder.net, validkiosk2.kioskfinder.net, etc.) is valid through that wildcard certificate. Thus, in practice, if a first kiosk reports to the tracker server that its unique ID is "validkiosk1," then its DSS becomes "validkiosk1.kioskfinder.net." With a wildcard certificate, this DSS will be valid in the root DNS server because the tracker server will have previously configured the domain "kioskfinder.net" as a valid root domain with the root DNS server.

Although various exemplary embodiments of the invention have been disclosed, it will be apparent to those skilled in the art that various changes and modifications can be made that will achieve some of the advantages of the invention without departing from the spirit and scope of the invention. These and other obvious modifications are intended to be covered by the claims.

What is claimed is:

1. A system comprising:
a vendor kiosk, a tracker server, and a root domain name system ("DNS") server, wherein the vendor kiosk, the tracker server, and the root DNS server are operatively connected to one another;
wherein the vendor kiosk is configured to, upon boot-up, perform the following functions:
automatically connect to a local area network ("LAN"); and
report a local IP address and unique identifier corresponding to the vendor kiosk to the tracker server;
wherein the tracker server is configured to:
receive the local IP address and unique identifier from the vendor kiosk;
create a device specific subdomain ("DSS") for the vendor kiosk based on the unique identifier, wherein the DSS is compatible with DNS server registration requirements;
send the DSS and the local IP address to the DNS server;
generate a list of kiosks from geographic or location information provided by the remote client device; and
provide the DSS to a remote client device connected to the LAN in response to receiving a selection of a preferred retail store location from the list of kiosks,
wherein the root DNS server maintains a registration database and is configured to:
receive the DSS and local IP address from the tracker server; and
update the registration database by mapping the DSS and the local IP address.

2. A method for tracking a vendor kiosk and connecting the vendor kiosk to a remote client device, comprising:
receiving, at a tracker server, a local IP address and unique identifier corresponding to the vendor kiosk, wherein the tracker server is physically located remotely from the vendor kiosk and is operatively connected to the vendor kiosk, and wherein the local IP address corresponds to a local area network ("LAN") to which the vendor kiosk is connected;
creating, by the tracker server, a device specific subdomain ("DSS") corresponding to the vendor kiosk based on the unique identifier, wherein the DSS is compatible with registration requirements of a root domain name system ("DNS") server;
sending a DNS update request to the root DNS server, wherein the update request comprises the DSS and the local IP address of the vendor kiosk;
generate a list of kiosks from geographic or location information provided by the remote client device; and
providing the DSS to a remote client device connected to the LAN in response to receiving a selection of a preferred retail store location based on provided geographic or location information from the list of kiosks, wherein the DSS is configured to resolve, at the root DNS server, into the local IP address corresponding to the vendor kiosk.

3. The system of claim 1, wherein the vendor kiosk is further configured to re-boot at a pre-established time interval that is pre-programmed into firmware installed into the vendor kiosk.

4. The system of claim 1, wherein the DSS is unique to the vendor kiosk.

5. The system of claim 4, wherein the DSS is generated by a media access control address for the vendor kiosk.

6. The system of claim 1, wherein the tracker server is further configured to store the local IP address and unique identifier corresponding to the vendor kiosk.

7. The system of claim 1, wherein the tracker server is further configured to transmit to a customer mobile device a DNS-compatible name that resolves to the local IP address of the vendor kiosk.

8. The system of claim 1, wherein the DNS server is further configured to receive a transmission of DSS information corresponding to the vendor kiosk from a customer mobile device.

9. The system of claim 8, wherein the DNS server is configured to map the DSS information received from the customer mobile device to the corresponding IP address for the vendor kiosk.

10. The system of claim 1, wherein the vendor kiosk is further configured to receive an HTTPS HEAD or HTTPS GET request from a customer mobile device and establish a direct connection with the customer mobile device.

11. The system of claim 10, wherein the vendor kiosk, once having established a direct connection with the customer mobile device, is configured to receive and fulfill customer photo product orders.

* * * * *